(12) United States Patent
Nayfeh et al.

(10) Patent No.: US 9,475,985 B2
(45) Date of Patent: *Oct. 25, 2016

(54) NANOSILICON-BASED ROOM TEMPERATURE PAINTS AND ADHESIVE COATINGS

(75) Inventors: Munir H. Nayfeh, Urbana, IL (US); Ebtesam Mohammed Salah Al-Olayan, Rivadh (SA)

(73) Assignee: NanoSi Advanced Technologies, Inc., Champaign, IL (US)

( * ) Notice: Subject to any disclaimer, the term of this patent is extended or adjusted under 35 U.S.C. 154(b) by 1408 days.

This patent is subject to a terminal disclaimer.

(21) Appl. No.: 12/241,881

(22) Filed: Sep. 30, 2008

(65) Prior Publication Data
US 2009/0090893 A1    Apr. 9, 2009

Related U.S. Application Data

(60) Provisional application No. 60/997,686, filed on Oct. 4, 2007.

(51) Int. Cl.
| C09K 11/59 | (2006.01) |
| C09D 5/22 | (2006.01) |
| C01B 33/02 | (2006.01) |
| B82Y 30/00 | (2011.01) |

(52) U.S. Cl.
CPC ............ C09K 11/59 (2013.01); B82Y 30/00 (2013.01); C01B 33/02 (2013.01); C09D 5/22 (2013.01); *C01P 2004/64* (2013.01)

(58) Field of Classification Search
CPC .................................. C09K 11/59; C09D 5/22
USPC .............................. 252/301.36; 428/450, 458
See application file for complete search history.

(56) References Cited

U.S. PATENT DOCUMENTS

| 5,891,548 | A  | * | 4/1999  | Graiver ................. B82Y 30/00 204/157.41 |
| 6,410,934 | B1 |   | 6/2002  | Nayfeh et al. |
| 6,456,423 | B1 |   | 9/2002  | Nayfeh et al. |
| 6,585,947 | B1 |   | 7/2003  | Nayfeh et al. |
| 6,597,496 | B1 |   | 7/2003  | Nayfeh et al. |
| 6,635,363 | B1 | * | 10/2003 | Duclos et al. ................ 428/690 |
| 6,660,152 | B2 |   | 12/2003 | Nayfeh et al. |
| 6,743,406 | B2 | * | 6/2004  | Nayfeh et al. ................ 423/348 |
| 6,846,474 | B2 |   | 1/2005  | Nayfeh et al. |
| 6,852,443 | B1 |   | 2/2005  | Ohlsen |
| 6,984,842 | B1 |   | 1/2006  | Nayfeh et al. |
| 6,992,298 | B2 |   | 1/2006  | Nayfeh et al. |
| 7,001,578 | B2 |   | 2/2006  | Nayfeh et al. |
| 7,429,369 | B2 |   | 9/2008  | Nayfeh et al. |
| 2004/0245912 | A1 | * | 12/2004 | Thurk et al. ................. 313/484 |
| 2005/0072679 | A1 |   | 4/2005  | Nayfeh |
| 2006/0019466 | A1 |   | 1/2006  | Nayfeh et al. |
| 2006/0213779 | A1 |   | 9/2006  | Nayfeh |
| 2008/0081865 | A1 | * | 4/2008  | Biswas et al. ................ 524/445 |
| 2009/0011295 | A1 |   | 1/2009  | Yau et al. |
| 2009/0090893 | A1 |   | 4/2009  | Nayfeh |

FOREIGN PATENT DOCUMENTS

| WO | WO2007/016080 | 2/2007 |
| WO | WO2007/018959 | 2/2007 |
| WO | WO2008/051235 | 5/2008 |

OTHER PUBLICATIONS

Singha. Polymer composite/nanocomposite processing and its effect on the electrical properties. 2006 Annual Report Conference on Electrical Insulation and Dielectric Phenomena.*
Ligman. Electroluminescence from surface oxidized silicon nanoparticles dispersed within a polymer matrix. Applied Physics Letters 90, 061116 (2007); doi: 10.1063/1.2471662.*
Ragosta. Epoxy-silica particulate nanocomposites: Chemical interactions, reinforcement and fracture toughness.Polymer 46 (2005) 10506-10516.*
O. Akcakir et al., "Detection of Luminescent Single Ultrasmall Silicon Nanoparticles using Fluctuation Correlation Spectroscopy", *Applied Physics Letters*, vol. 76I, No. 14, Apr. 3, 2000, pp. 1857-1859.
G. Belomoin et al., "Observation of a Magic Discrete Family of Ultrabright Si Nanoparticles", *Applied Physics Letters*, vol. 80. No. 2, Feb. 4, 2002, pp. 841-843.
M. Nayfeh et al., "Highly Nonlinear Photoluminescence Threshold in Poruos Silicon", Applied Physics Letters, vol. 75, No. 26, Dec. 27, 1999, pp. 4112-4114.

* cited by examiner

*Primary Examiner* — Matthew E Hoban
(74) *Attorney, Agent, or Firm* — Greer, Burns & Crain, Ltd.

(57) ABSTRACT

A composite of the invention is a homogenous mixture of room temperature vulcanizing material or polymer and luminescent silicon nanoparticles. The composite can be formed into a film and can serve as a paint, adhesive, or coating, depending upon the material or polymer used. A preferred polymer is polyurethane. A method for forming a silicon nanoparticle and room temperature vulcanizing (RTV) material or polymer composite of the invention includes steps of providing silicon nanoparticles that were prepared in a solvent. The solvent is mixed with RTV or polymer precursors. The RTV or polymer components are permitted to cure. A preferred solvent is isopropynol alcohol.

9 Claims, 2 Drawing Sheets

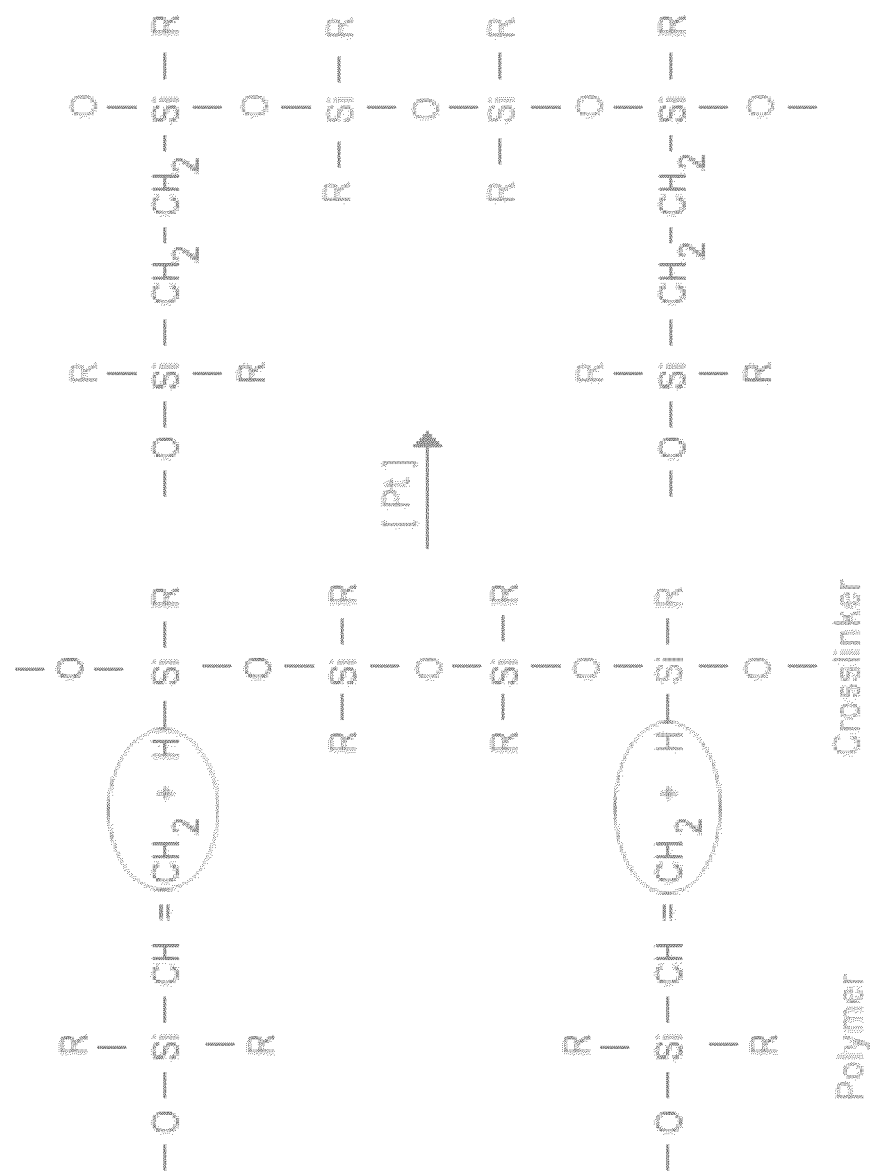

NANOSILICON-BASED ROOM TEMPERATURE PAINTS AND ADHESIVE COATINGS

PRIORITY CLAIM AND REFERENCE TO RELATED APPLICATION

This application claims priority under 35 U.S.C. §119 from prior provisional application Ser. No. 60/997,686, which was filed Oct. 4, 2007.

FIELD

A field of the invention is coatings, including adhesives. Another field of the invention is nanosilicon materials. Example applications of the invention include adhesives, photonics, solar energy, LED lighting, health monitoring and protection of civilian and military infrastructure.

BACKGROUND

Vulcanized rubber is cured rubber. The vulcanizing curing process makes the rubber useful, durable and resistant to chemical attack. It also makes the surface of the material smoother and prevents it from sticking to metal or plastic chemical catalysts.

The reconstitution of silicon nanoparticles from colloids into high quality thin films that coat surfaces or solid objects has been found useful in applications as diverse as nano-memory and painting interior walls of buildings. Common to all applications is the requirement of high quality films. The ability of the particles to disperse in the solvent affects the quality of the products in the manufacturing process treating suspensions.

SUMMARY OF THE INVENTION

A composite of the invention is a homogenous mixture of room temperature vulcanizing material or polymer and luminescent silicon nanoparticles. The composite can be formed into a film and can serve as a paint, adhesive, or coating, depending upon the material or polymer used. A preferred polymer is polyurethane. A method for forming a silicon nanoparticle and room temperature vulcanizing (RTV) material or polymer composite of the invention includes steps providing silicon nanoparticles that were prepared in a solvent. The solvent is mixed with RTV or polymer precursors. The RTV or polymer components are permitted to cure. A preferred solvent is isopropynol alcohol.

BRIEF DESCRIPTION OF THE DRAWINGS

FIG. 2 illustrates a process by which nanoparticles are incorporated homogeneously into RTV coatings.

DETAILED DESCRIPTION OF THE PREFERRED EMBODIMENTS

Figure 1:
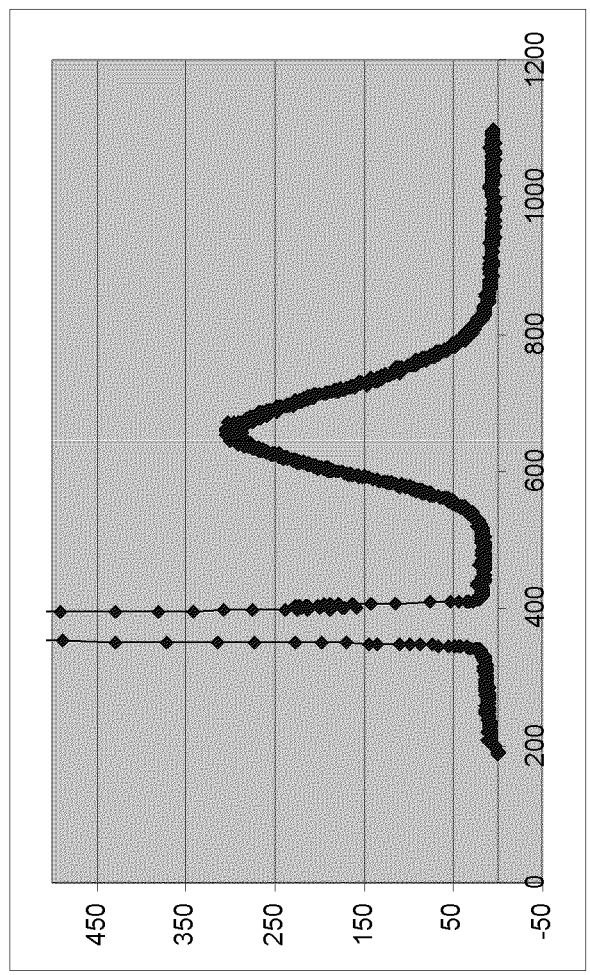
FIG. 1 shows the spectrum responsive to 365 nm irradiation of an experimental example room temperature vulcanizing coating of the invention.

Embodiments of the invention include luminescent coatings, including adhesives. An embodiment of the invention is a silicon nanoparticle luminescent coating with room temperature adhesive properties. A preferred embodiment is a transparent coating, and includes a substantially uniform mixture of luminescent silicon nanoparticles, e.g., red luminescent nanoparticles.

Other embodiments include silicon nanoparticle-polyurethane paints. Polyurethane is luminescent in the blue when it is illuminated by 365 nm radiation. But when silicon nanoparticles are added to the stain, the combined stain becomes red luminescent (or another color depending upon the size of the nanoparticles).

In a method of the invention, chemical dissolution via Si—H bond interaction with vinyl type C=C double bonds is used to provide nanoparticles in thin room temperature vulcanized films with good dispersion and uniformity, and without inducing aggregation or brittleness. Coatings of the invention provide the ability to control the size, shape, packing, thickness, and delivery of the surface to be used. The luminescent silicon nanoparticles provide a pigment that is useful in many applications.

A silicon nanoparticle-based adhesive coating that is commercially feasible is also provided by the invention. The amount of nanoparticles are reasonable (at competitive cost), are high quality nanoparticles, i.e., highly fluorescent (high quantum yield), and can be identical in shape and size, and amenable to coating to allow homogeneous dissolution in the solvent and prevent agglomeration upon drying. Aggregation and excessive variation in size are avoided in coatings of the invention. Aggregation or/and excessive variation in size can cause brittleness, defects, peeling, lack of adhesiveness, uneven films or coatings, texture changes, and loss of transparency.

An embodiment of the invention is a nanosilicon-based room temperature vulcanizing rubber adhesive. The room temperature vulcanizing rubber adhesive exhibits ultrabright red luminescence (due to the use of red luminescent silicon nanoparticles, while other sized and color silicon nanoparticles are used in other embodiments). The example embodiment room temperature vulcanizing rubber adhesive has been prepared in experiments and has been demonstrated as an effective adhesive coating for glass and ceramics. As an example, glass substrates and ceramic tiles have been coated with the room temperature vulcanizing rubber adhesive. The coating, which can be applied as a paint is applied, stays rubbery and adhesive, developing no brittleness. Moreover, it stays transparent, indicating uniform mixing of silicon nanoparticles with no agglomeration. This fluorescent adhesive coating constitutes a platform technology with applications as diverse as photonics, solar energy, LED lighting, health monitoring and protection of civilian and military infrastructure. One particular example use for prior room temperature vulcanizing adhesive is the attachment of pads and tiles to the space shuttle.

Silicon nanoparticles used in embodiments of the invention can be obtained by various processes known in the art. The size of the nanoparticles used will determine the luminescent response of the coatings and paints of the invention. Example methods for producing nanoparticles used in embodiments of the invention are disclosed in U.S. Pat. No. 7,001,578, entitled "Family of discretely sized silicon nanoparticles and method for producing the same"; and in U.S. Pat. No. 6,846,474, entitled "Silicon nanoparticle and method for producing the same," Silicon nanoparticles obtained by other methods can also be used in embodiments of the invention so long as the methods can provide a colloid of nanoparticles, preferably of uniform dimension, and so long as the methods produce silicon nanoparticles that have multiple Si—H termination sites. The multiple Si—H termination sites have been determined to permit chemical bonding with RTV polymer adhesive and paints.

A concern with mixing additional components into RTV polymers is a potential negative effect on the adhesive and drying properties of the RTV polymers. Generally, particulate additions to RTV polymer components can inhibit critical adhesive and drying properties. Surprisingly, the Si—H terminated silicon nanoparticles do not aggregate when mixed with RTV polymer components. This was a surprising result, as the addition of particles to RTV polymer components is typically expected to inhibit the properties of the compounds and result in the aggregation of particles.

A composite of the invention is a homogenous mixture of room temperature vulcanizing material or polymer and luminescent silicon nanoparticles. The composite can be formed into a film and can serve as a paint, adhesive, or coating, depending upon the material or polymer used. A preferred polymer is polyurethane. A method for forming a silicon nanoparticle and room temperature vulcanizing (RTV) material or polymer composite of the invention includes steps providing silicon nanoparticles that were prepared in a solvent. The solvent is mixed with RTV or polymer precursors. The RTV or polymer components are permitted to cure. A preferred solvent is isopropynol alcohol.

Experiments and particular example coatings and paints will now be discussed. The experiments have demonstrated example embodiment coatings and paints, while artisans will appreciate broader aspects of the invention from the experimental embodiments.

In the experiments, several stand alone silicon nano particle adhesive paints were prepared in organic solvents. The experiments used blue luminescent 1 nm silicon nanoparticles and red luminescent 2.85 nm silicon nanoparticles. Colloids of uniformly dimensioned blue luminescent 1 nm particles were prepared in preferred THF, isopropynol, ethanol, and methanol solvents with varying concentrations, including 1 micro molar. Colloids of uniformly dimensioned red luminescent 2.85 nm particles were also prepared in the same solvents with similar concentration. The preferred organic solvents are convenient for quick drying.

Luminescent silicon nanoparticles were then impregnated in room temperature vulcanizing silicone rubber glue to form a homogenous mixture. The silicon rubber glues used were low-molecular-weight liquid room-temperature-vulcanizing (RTV) polymers that are interlinked at room temperature after being cast or molded into a desired shape.

In one experiment, red luminescent nanoparticles were prepared in isopropynol solvent with a micro molar concentration. The particles were then mixed with RTV components. The mixing procedure used in the experiments began with mixing 1 gram and 300 mg of RTV components. The red luminescent nanoparticles were then added to the RTV components and the mixture was stirred vigorously with a glass rod followed by brief sonification. The mixing completes formation of a luminescent nanoparticle coating of the invention.

In the experiments, both of the pre-mixed components and final coating were checked for luminescence. The RTV pre-mixed components were found to be weakly fluorescent materials in the blue part of the spectrum with 365 nm irradiation. The coating, on the other hand, is highly luminescent in the red part of the spectrum with 365 nm irradiation. Specifically, the photoluminescence spectra of the nanoparticle-RTV coating was taken using excitation with 365 nm radiation from a mercury lamp and using a fiber optic holographic grating system was taken.

These results are shown in FIG. 1, which shows the response spectrum of the pre-mixed components and final coating in response to the 365 nm irradiation. The spectrum and visual observation reveal that the luminescence from the cured RTV-nanoparticle mixture is very bright red exhibiting a strong dominant peak of emissions in the red band that dominates the original weak blue luminescence of the RTV pre-mixed components. The red response persists over time after the formation of the nanoparticle-RTV coating. The nanoparticle-RTV coating continues to show ultrabright red emission, indicating that the RTV is not compromising the particles. Importantly, there is also no significant aggregation of the particles, which permits the adhesive to stay transparent and retain good quality upon drying.

Several particle pigments were tested in organic solvents to determine compatibility with RTV. Particles were tested in THF. A glass substrate was coated with the mix nano-RTV. The film on the glass plate continues to be luminescent after several days. Ceramic tiles made from porcelain were coated with the nano-RTV or nanosilicon-RTV paint to test the adhesiveness of the coatings. The coating stays rubbery. The particles have not made it brittle and as such did not compromise the mechanical properties.

The silicon nanoparticles are mixed with the adhesive RTV components in a very low concentration and have no overall effect on the strength of the adhesive. The adhesion strength was demonstrated. The RTV mixed with particles holds together a smooth glass slide and a rough ceramic tile. In the trial the unfinished back side of the ceramic tile was used.

A concern with mixing additional components into RTV polymers is a potential negative effect on the adhesive and drying properties of the RTV polymers. Generally, particulate additions to RTV polymer components can inhibit critical adhesive and drying properties. Surprisingly, the Si—H terminated silicon nanoparticles do not aggregate when mixed with RTV polymer components. This was a surprising result, as the addition of particles to RTV polymer components is typically expected to inhibit the properties of the compounds and result in the aggregation of particles. The mechanism that permits this is believed to occur as follows.

The key to the basic process of the formation of uniform dispersion (getting rid of agglomeration upon drying) of the nanoparticles is described as follows. RTV is a silicone rubber, consisting of a polymer monomer and a crosslinker. The gluing process is outlined here and in FIG. 2. The monomer polymer contains the double bond compound of vinyl groups S—HC=C—H2 with S representing a silicon alkoxy compound. The cross-linker is an alkoxy Si compound with repeated S—H groups. The monomers are cross-linked with each other (vulcanized or cured) by attaching the S—H groups to double bonds. This is called an addition curing process.

The silicon nanoparticles used include multiple Si—H termination sites. Thus, the silicon nanoparticles can be incorporated in the process as a chemical phase by replacing some of the Si—H linking points in the crosslinker. Another possible phase is a physical phase, in which the particles are trapped in glue between its hydrogen contact points. The hydrogen contact points along the linker are separated by six Si—O bonds (about 1 nm) (see FIG. 2). Thus incorporated particles may disrupt few contact points. Because the density of the nanoparticles is low compared to the monomer concentration, it can be seen why the particles will not compromise the main function of the glue.

Additional experiments formed a silicon nanoparticle-polyurethane paint by forming a homogenous mixture of silicon nanoparticles and polyurethane paint with a small percentage of silicon nanoparticles. Polyurethane is luminescent in the blue when it is illuminated by 365 nm radiation. When the particles are added to the stain consistently with the present methods, the combined stain becomes red luminescent as the adhesive RTV coating did. The particles with hydrogen coating allow attachment to the adhesive or paint components chemically, which was demonstrated in the experiments to prevent aggregation and produces uniform paint or adhesive coatings. Brittleness due to agglomeration does not occur.

Use of a THF solvent for the nanoparticle colloid suspension does inhibit full drying under room temperature conditions. Gentle heating during curing allows the THF to be driven out quickly helped, but full curing was still inhibited. The THF could have been interfering with the vulcanization of the polymer, and alternate curing techniques may be necessary if THF is used as the solvent.

Other solvents were also tested, including alcohols and these solvents performed better. In one example, RTV and red nanoparticles that were prepared in isopropynol alcohol instead of THF were tested. Adhesive coating (glue) samples were prepared with and without particles, and were allowed to dry in a small bottle. After drying, the pure RTV shows only the residual blue luminescence, while the nanoparticle-RTV shows the particle red emission band in addition to the blue luminescence band from RTV (see FIG. 1). With the non-THF solvents, when the silicon nanoparticle-RTV glue was applied to a back side of a ceramic tile, it dried fully and as quickly as pure RTV. The glue is still effective in sticking to surfaces. A microscope slide was also glued to the tile using the red silicon nanoparticle glue to demonstrate the glue with a see through object. Moreover, it is rubber like; and the particles did not compromise the elastic properties of RTV. Yet, the glue is now red luminescent, easily seen by the naked eye under 365 or 254 nm irradiation. Other types of alcohols worked very well too.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for forming a silicon nanoparticle and room temperature vulcanizing (RTV) material or RTV polymer composite, the method comprising steps of:
   providing a first mixture of silicon nanoparticles and a solvent, wherein the solvent comprises isopropynol;
   mixing the first mixture with RTV material or RTV polymer precursors to form a second mixture; and
   permitting the RTV material or RTV polymer components of the second mixture to cure.

2. The method of claim 1, wherein said mixing comprises stirring.

3. The method of claim 2, wherein said mixing further comprises sonication.

4. The method of claim 1, wherein the silicon nanoparticles have multiple Si—H termination sites;
   wherein said mixing the first mixture chemically bonds the RTV material or RTV polymer precursors with the Si—H termination sites.

5. The method of claim 4, wherein the silicon nanoparticles do not aggregate after said mixing.

6. The method of claim 1, wherein said providing comprises:
   providing the silicon nanoparticles and the solvent; and
   mixing the silicon nanoparticles and the solvent.

7. The method of claim 1, wherein said providing comprises mixing the silicon nanoparticles in the solvent.

8. The method of claim 1, wherein the RTV material or RTV polymer comprises polyurethane.

9. The method of claim 1, wherein the RTV material or RTV polymer comprises silicone rubber.

* * * * *